May 7, 1963 J. S. CHRISTIE 3,088,479
SYSTEM OF COLOR MONITORING
Original Filed Feb. 13, 1958 5 Sheets-Sheet 1

Inventor:
John S. Christie
by Howson & Howson
Attys.

May 7, 1963  J. S. CHRISTIE  3,088,479
SYSTEM OF COLOR MONITORING
Original Filed Feb. 13, 1958  5 Sheets-Sheet 2

Inventor:
John S. Christie
by Howson & Howson
Attys.

May 7, 1963 J. S. CHRISTIE 3,088,479
SYSTEM OF COLOR MONITORING
Original Filed Feb. 13, 1958 5 Sheets-Sheet 3
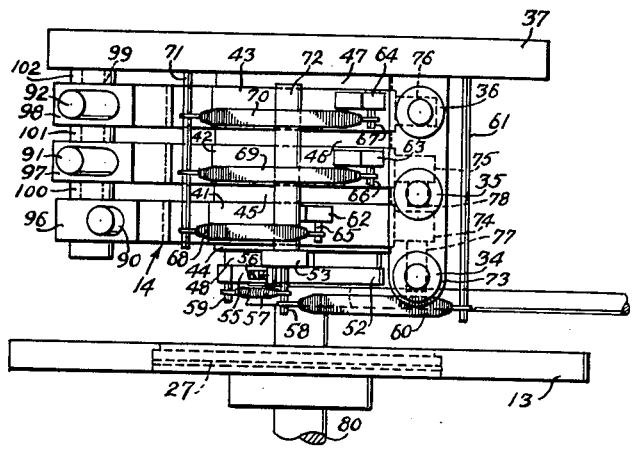
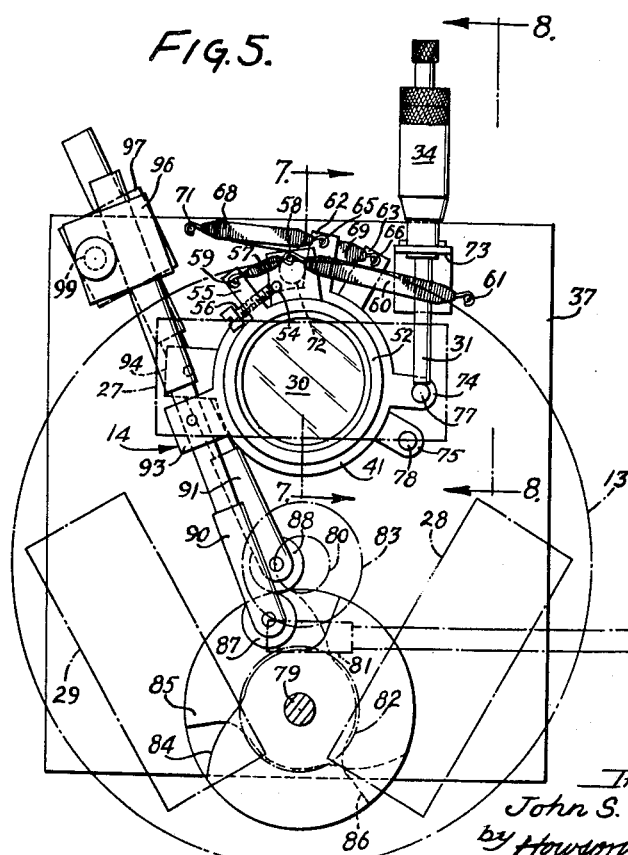
Inventor:
John S. Christie
by Howson & Howson
Attys.

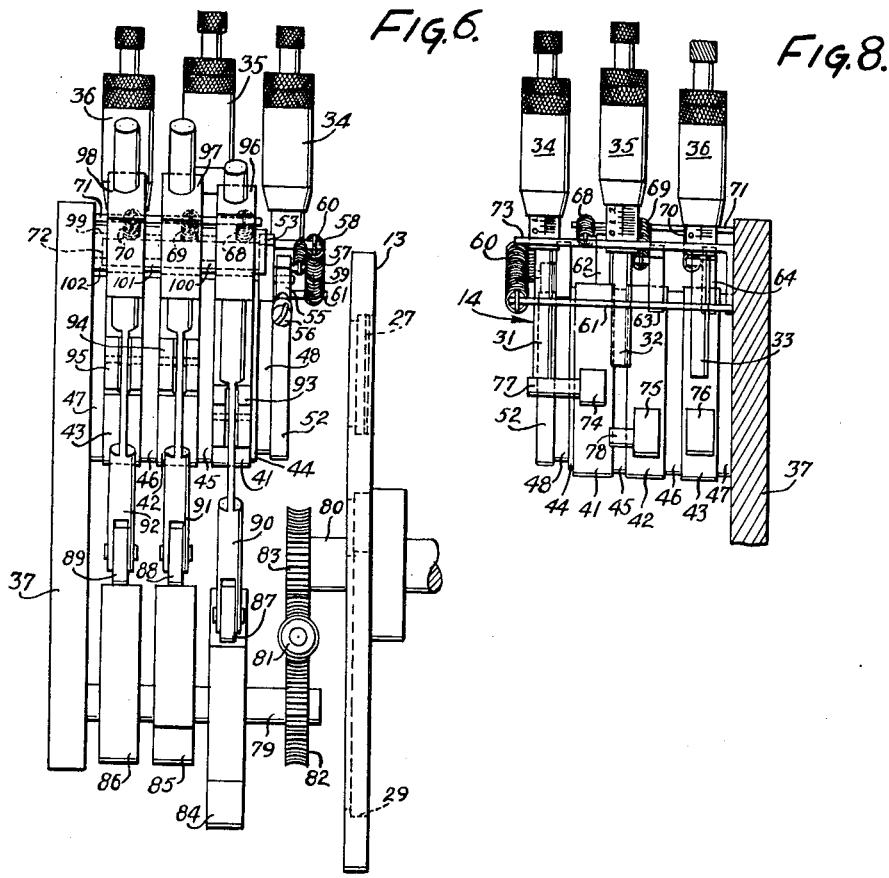
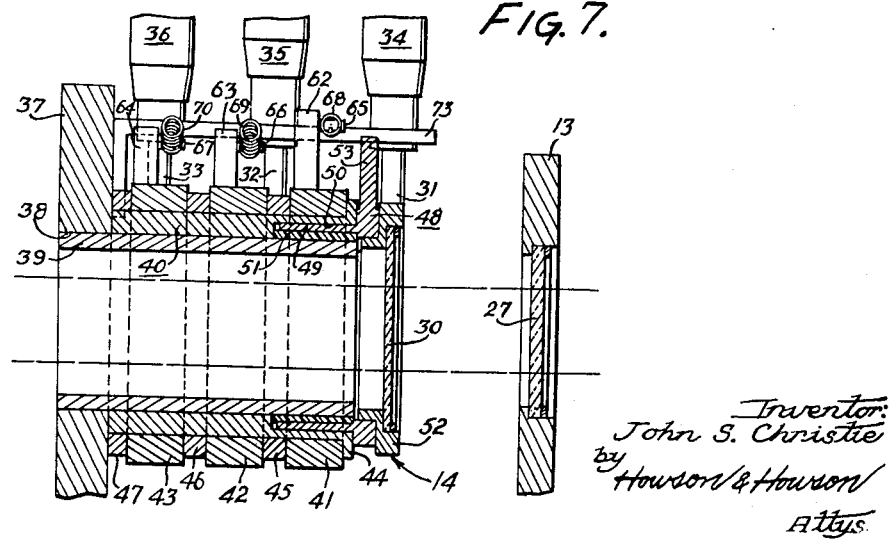

May 7, 1963

J. S. CHRISTIE 3,088,479

SYSTEM OF COLOR MONITORING

Original Filed Feb. 13, 1958

INVENTOR:
JOHN S. CHRISTIE
BY
Howson & Howson
ATTYS.

developed into a commercial product. Fluid colors are frequently unstable or are subject to

United States Patent Office 3,088,479
Patented May 7, 1963

3,088,479
SYSTEM OF COLOR MONITORING
John S. Christie, Oreland, Pa., assignor, by mesne assignments, to Proctor & Schwartz, Inc., Philadelphia, Pa., a corporation of Pennsylvania
Original application Feb. 13, 1958, Ser. No. 714,988, now Patent No. 2,978,951, dated Apr. 11, 1961. Divided and this application July 28, 1959, Ser. No. 830,001
4 Claims. (Cl. 137—93)

This invention relates to a method of monitoring the color of a transparent fluid which is colored by a combination of two or more color constituents. This invention also relates to the system for monitoring the color of such a fluid, which system may be provided with a novel light transmissive color standard.

Fluid colors are frequently unstable or are subject to deterioration by depletion of one or more of the constituents, yet in many instances it is desirable to maintain the color of a fluid to a high degree of accuracy. A particular instance is the case of dyes used to dye fabrics. Such dyes are ordinarily a mixture of two or more constituent dyes which are blended in certain ratios and amounts to form the desired color. As fabric is dyed certain ones of the constituent dyes may be depleted more rapidly than others; also effects such as deterioration under light and other effects may cause fading of the dye solution as a whole or of one or more of the constituents so that gradually the color of the dye changes.

In a certain area of the fabric dyeing art goods are dyed under conditions requiring constant temperature, time of exposure to dye, flow rate of dye solution, and concentration of dye stuffs. Although the first three variables are easily controllable by standard instrumentation, heretofore there has been no method of, or system for, effectively controlling dye concentration to obtain a desired uniform effect. For such applications a satisfactory means of keeping dye concentrations has long been sought, but no satisfactory system for doing this has been devised.

The present invention relates to a method of monitoring the color of continually flowing fluids which produces essentially constant results which are not subject to human error by visual judgment. The invention also concerns a method which can employ known color comparison systems.

Broadly speaking, the method comprises selecting a standard to simulate the desired color and selecting a sample of predetermined size from the bath for comparison with the standard. The fluid sample from the bath is constantly replaced in order to accomplish monitoring. A light beam is passed through the standard and then split into two beams having different intensities, one of the two beams passes through the sample. The two beams split from the one are continuously compared after passing through the sample to detect any deviation from the predetermined relative light intensities of these beams which obtains when the sample matches the color represented by the standard.

The standard is preferably adjusted so that the intensities of the two light beams are equal. In most cases where the color is a mixture of constituent colors from the visible range, the light beams are sequentially filtered to produce different colors so that the standard and the sample can be simultaneously compared in each of several selected frequency bands of light. While the monitoring or detecting of deviations from the standard may be sufficient in itself to permit manual adjustment for correction, for example, the present invention also contemplates that when deviations are detected a signal may be produced by apparatus sensitive to deviations which will actuate a solenoid operated valve or otherwise effectively provide for the addition of color constituents to the fluid mixture.

The method is ordinarily practiced in conjunction with a novel monitoring system in which along a beam path means is provided for splitting a beam into two beams. A standard representing the color to be matched by the fluid is arranged in the original beam path, and a sample holder is arranged in one of the two split beam paths. A flow path is provided between the bath and the sample holder permitting constant change of the sample, and means is provided for producing continuous flow from the bath to the sample holder. After the beam passes through the sample, means is provided for comparing the intensities of the two beams to determine deviation of the two beams from their predetermined relative light intensities which obtain when the sample matches the color represented by the standard. Additional apparatus may be provided for accomplishing the additional method steps necessary in the practice of the present invention.

In accordance with this invention, the so-called "color standard" is not of a particular color but is preferably of a light intensity regulating system including polarizing members which are used in conjunction with colored filters which limit the band width of frequencies transmitted. By adjusting one polarizing member relative to another the light transmission in the original light beam is effectively made to simulate the light transmission through a color standard for each of the filter colors employed. Of course, under conditions of monochromatic light, no filtering would be required and only the intensity regulating means would be necessary, but this is an isolated and unusual condition from a practical standpoint. For use in more usual circumstances is a preferred type of standard which in accordance with the present invention regulates the light intensity by light polarization by means hereafter described and claimed. The beam splitting technique employed also permits the maximum intensity of the two beams to differ so that the polarizing medium may reduce the intensity of the uninterrupted split beam and establish relative intensities in the beams such that the intensity of the beam which is to pass to the sample is reduced by its filtering effect to the same intensity as the other split beam.

The invention may be clearly understood from the following detailed description with reference to the accompanying drawings, in which:

FIG. 4 is a plan view of the preferred mechanism provided by this invention to effect equalization of transmission of the light beams as above-mentioned;

FIG. 5 is a face view of this mechanism;

FIG. 6 is a side elevational view of the same;

FIG. 7 is a sectional view taken along line 7—7 of FIG. 5;

FIG. 8 is a sectional view taken along line 8—8 of FIG. 5;

Figure 1:
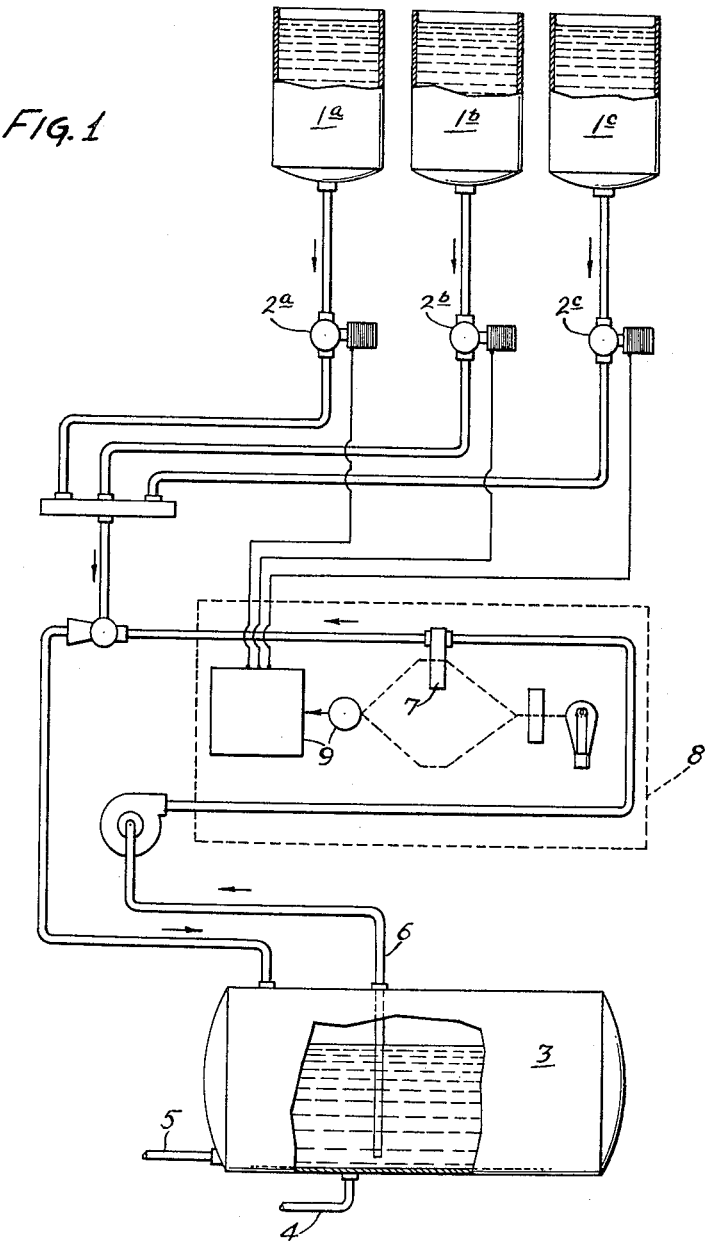
FIG. 1 is a schematic diagram showing the monitoring system of the present invention.

Referring first to FIG. 1, a system embodying the present invention is shown schematically. This system employs a transparent fluid whose color is controlled by a monitoring device which not only detects deviation in color of a fluid bath but also corrects the color of that bath back to the standard color. Correction is accomplished by adding fluids of constituent colors from the individual tanks 1a 1b and 1c, and these are added through valves 2a, 2b or 2c which may be actuated by solenoids or other flow control means. The fluids are fed into a manifold and on into a tank 3 wherein mixing is completed. The mixed fluid may, for example, be dye fed through line 4 to a dyeing chamber, and the partially exhausted dye may be returned to the tank through line 5. Other fluids, of course, can be used in place of dyes. Samples of fluid thoroughly mixed by means not shown are withdrawn from tank 3 through line 6 to pass through a sample cell 7 of predetermined size and arrangement. The sample cell is in a color-comparison device 8 which will be described hereafter in greater detail and which constitutes the heart of the present invention. Deviations of the fluid color from the standard are detected by detection and signal producing means 9 which, in turn, is coupled to the valve means 2a, 2b and 2c controlling flow of colored fluid constituents so that upon detection of error the appropriate valves can be actuated in order to add fluid to correct the color. For a better understanding of the fluid mixing system and a detailed treatment of the system per se, as opposed to the monitoring device, reference is had to my copending application Serial Number 610,159 filed September 17, 1956, and now Patent No. 2,979,066.

Figures 2, 3:
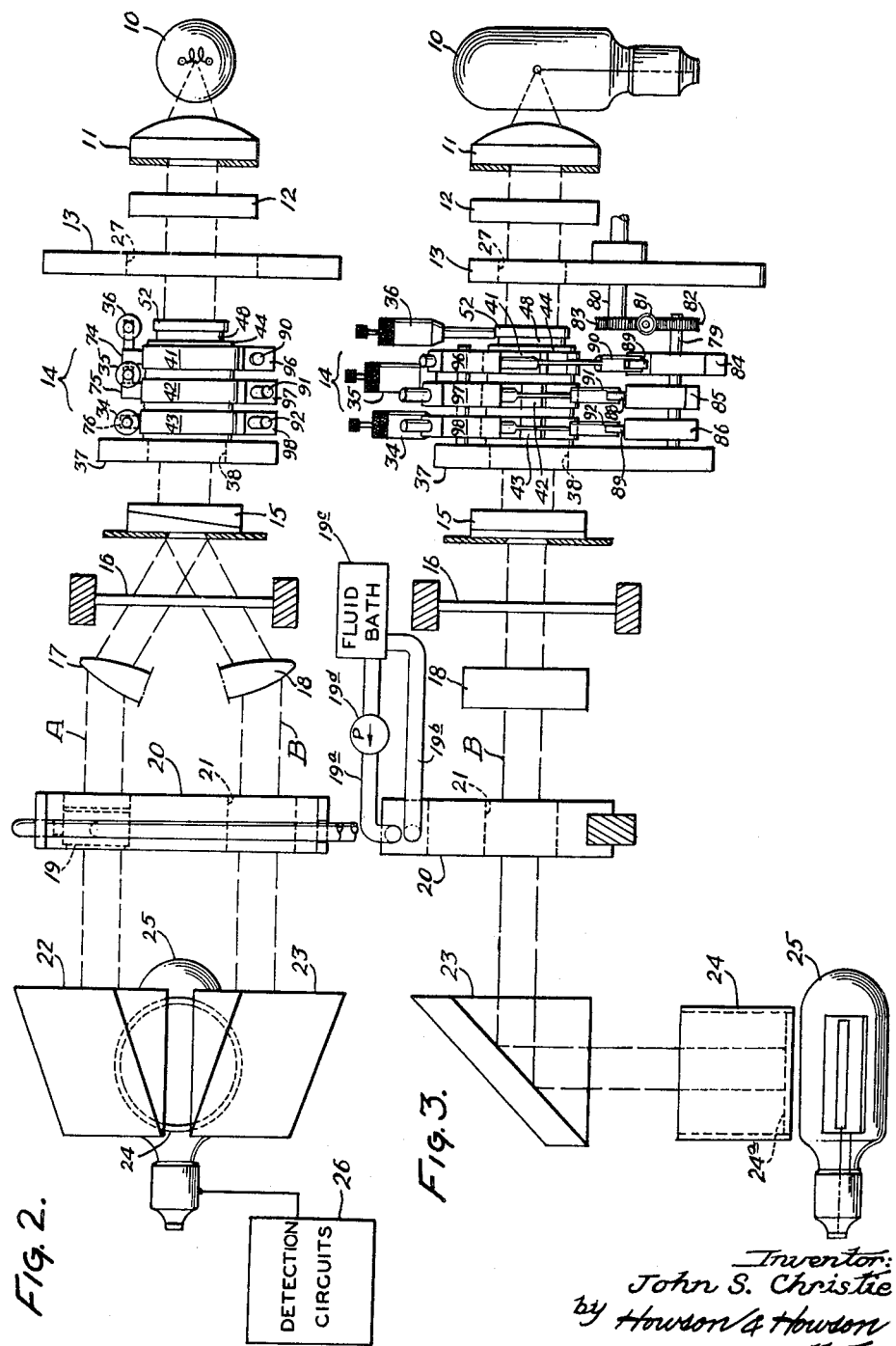
FIG. 2 is a generally diagrammatic plan view of a color comparison portion of the monitoring system of the present invention.
FIG. 3 is a similar elevational view of the color comparison portion of the system.

Referring to FIGS. 2 and 3, a system of the present invention adapted from a color comparator system of a general type known in general in the prior art is illustrated. The color comparison system as manufactured and before modification in accordance with the present invention is intended to quantitatively analyze primary color components present in static test sample of a light transmissive medium. As such, color comparison systems of this type serve simply as static color comparison systems. For example, such systems employing a pair of beams split from one have been used by dye and paint manufacturers to analyze a dye or paint which is put in a standard cell or holder through which passes one of the two beams and in terms of constituent dyes in wedge or other varying cross sectional holders through which the other beam passes and which are adjusted until the light passing through all of them is essentially the same as the light passing through the dye in the sample cell. The relative thicknesses of the test samples is then measured to determine the ratio of constituent dyes so that the constituent dye colors can be mixed to duplicate the color of the dye in the standard cell.

The present invention is not for the purpose of static analysis but for the purpose of monitoring; that is, the present invention has for its primary purpose the constant production of information necessary to the maintenance of the color of a standard fixed for a particular color. Thus, in effect, instead of analysis, the purpose of the present invention is to furnish information to enable proper synthesis, or, more accurately, to indicate deficiencies of constituent colors which must be added to bring the sample back to the standard color. Since the sample in this case is a continuously varying sample, its constituents can each vary different amounts from the standard or desired color at different times, and the monitoring system will supply information for correcting the constituents for each variation in the sample at the time of variation. It will be appreciated that the sample is being continuously drawn from the dye bath, and hence is representative of the needs of the bath.

A useful application of the comparator system is in the color testing of dye solution by comparison of light transmission through a sample of the dye solution with light transmission through a standard using several selected frequency bands of light. These light frequency bands, for example, may correspond respectively to the respective frequency bands of maximum absorbance of particular red dye, yellow dye and blue dye, all of which have maximum absorbance (i.e., minimum transmission) points in different places in the spectrum. A rotating filter wheel is employed, which has a monochromatic filter for each dye to transmit only the wave lengths corresponding to that dye (or color). The colored light is then filtered to relative levels proportional to those desired and finally the beam is split and one of the two resulting beams is passed through the dye solution to be monitored which is being circulated through a test cell.

It should be noted that while ideally it is desirable to employ a system as described using monochromatic filters having maximum transmission at the point of dye minimum light transmission, as a practical matter the constituent filters need not correspond exactly to the dyes of other constituent colors.

In the system of FIGS. 2 and 3, light from a source 10 is converged into a parallel beam by condensing lens 11, and passes through a heat absorbing element 12. The light beam then passes through a color filter wheel or disk 13 which is driven at constant speed and which, in the case of a tri-color system, has three monochromatic filters arranged to be brought successively and sequentially into the path of the light beam. In the system presently employed, the color filter wheel is driven at a speed of 5 r.p.m., but it may be driven at any suitable speed. Disregarding for the present the mechanism 14 provided by the present invention, the light beam passes through a Wollaston prism 15 which splits the beam into two divergent light beams A and B, and which also plane polarizes the beams so that beam A is polarized in a plane inclined at 90° to the plane of polarization of beam B and so that beam A is polarized in a plane inclined at 45° to the right of vertical and beam B is polarized in a plane inclined at 45° to the left of vertical. Element 16 is a rotating polarity-responsive filter whose plane of polarization rotates. When its plane of polarization is parallel to the plane of polarization of either beam A or beam B, it passes a maximum amount of the light of that beam; and when its plane of polarization is at right angles to the plane of polarization of either beam A or beam B, it does not pass any of the light from that beam. At other angles, the light passed is proportional to the sine of the angle. Due to the rotation of the polarity-responsive filter 16, the intensity of the light in each beam reaches a maximum and a minimum twice during each revolution, and since the two light beams are plane polarized 90° apart, there is a 90° time or phase relation between the beams. Thus the intensity of the two beams may be represented as sine waves with a 90° time or phase displacement between them.

Element 16 may be a Nicol prism, but in the system now being employed it is composed of two glass plates with a plastic or gelatin based polarizing filter element sandwiched between them. In the system now being employed, element 16 is mounted in a large diameter ball bearing and is driven through a toothed belt by a synchronous motor to insure synchronous speed. However, it could be mounted directly in a hollow shaft synchronous motor.

The divergent beams have their directions changed and become parallel beams by segmented cylindrical lenses 17 and 18. Beam A then passes through a cell 19, a sample holder through which the dye solution being monitored is circulated. The dye solution comes from a bath 19c represented schematically only in FIG. 3 by a block to which the sample cell is coupled by hose connection 19a through pump 19d or other appropriate means to produce continuous flow from the bath to the sample holder. Connection 19b permits the fluid to flow out either back to the bath or elsewhere. Cell 19 is mounted in a block 20 which has an aperture 21 through which the beam B may freely pass. In prior systems employing a color standard, the second beam B was passed through a standard cell containing dye solution of the desired color. As previously stated, this has been objectionable for a number of reasons, and the principal purpose of the present invention is to overcome the objections and disadvantages incident thereto. In accordance with the present invention, the light transmission in beam B is standardized, by means of mechanism 14 presently to be described, so as to simulate transmission through a color standard, without incurring the disadvantages of a color standard.

As shown in FIGS. 2 and 3, the two light beams A and B are redirected convergently downward by tilted prisms 22 and 23 through tube 24 onto a ground glass disk 24a at the bottom of said tube. If the light transmissions in the two beams A and B are equal, the illumination on the disk is substantially constant, because the light intensity of one beam decreases as that of the other beam increases, and vice versa. However, unequal transmission in the two beams A and B causes light pulses which produce an output from phototube 25 which, in turn, activates detection circuits 26. The latter may simply give an indication of the unbalanced condition and/or may control a valve to add dye stuff to the solution under test so as to increase its concentration, as in the system of FIG. 1.

In the system presently employed, element 16 is conveniently driven at a speed of 1800 r.p.m. a speed easily available from the 60 cycle per second frequency of the supply line from which the electrical circuits are operated. Thus the pulsating output of the phototube 25, when such output occurs, is synchronized with the supply current. This is useful in operation of the detection circuits. For example, the output of phototube 25 could be applied to a cathode ray tube whose sweep is controlled from the supply line. However, the present invention is not concerned with the electrical system.

In accordance with this invention, the standardization in beam B is effected by pre-polarizing the light by means of an element in the mechanism 14, so as to decrease the light transmission in beam B to equal the light transmission through a color standard. In the case of a tricolor system this is done for each of the three primary colors employed, so that the light transmission in beam B is standardized for each color. This pre-polarization of the light is accomplished by means of a rotatably adjustable light polarizing element. Suppose, for example, that this element were adjusted so as to polarize the light in a plane at 45° to the right of vertical. Full transmission would then be obtained in beam A, and there would be no transmission in beam B. On the other hand, if this polarizing element were adjusted to polarize the light in a plane at 45° to the left of vertical, full transmission would be obtained in beam B, and there would be no transmission in beam A. By adjustment of the element between these extreme positions, transmission is obtained in both of the beams, and by properly adjusting the element for each color, the transmission in beam B, the brighter of the two, can be decreased to equal the transmission in beam A after passing through a color standard.

Referring now particularly to FIGS. 4 to 8 which show the mechanism 14 of FIGS. 2 and 3, as may be seen in FIG. 5, the color filter wheel or disk 13 has three color filter sections 27, 28 and 29 which are brought sequentially into the path of the light beam from source 10. A light polarizing element 30 is disposed in the path of the light beam, and as mentioned above, this element is rotatably positioned, for each of the colors employed, so as to effect standardized transmission of light in beam B. The three different positions of the light polarizing element 30 are established by three adjustable stops 31, 32 and 33 (see FIG. 8) which, when adjusted, remain stationary. These stops are in the form of longitudinally adjustable stems of micrometer adjustment devices 34, 35 and 36.

The entire mechanism for effecting rotative adjustment of the polarizing element 30 is supported by a stationary supporting plate 37. As may be seen in FIG. 7, this plate has an aperture 38 for free passage of the light beam from source 10, and mounted in the aperture and extending forwardly from the supporting plate 37 is a tubular supporting member 39. Mounted on the member 39 is a fixed bearing sleeve 40 which serves to rotatably support rings 41, 42 and 43 that are held in place by flange 44 at the forward end of sleeve 40 and are maintained in spaced relation by rings 45, 46 and 47. Also rotatably supported by the sleeve 40 is a front ring 48 having a tubular extension 49 which extends into a recess 50 of sleeve 40 and is rotatable about a bearing sleeve 51 also disposed in said recess. The light polarizing element 30 is fixedly mounted in a supporting ring 52 which is rotatably supported by ring 48. As may be seen in FIG. 5, ring 48 has an extension 53 which carries a pin 54. Ring 52 has an extension 55 which carries an adjustment screw 56 engageable with pin 54, the purpose of which will be explained later. A spring 57 has its ends secured to pins 58 and 59 on the said extensions, and this spring serves always to maintain ring 52 in fixed relation to ring 48. Thus, the light polarizing element 30 is always maintained in fixed relation to ring 48 and rotates therewith whenever ring 48 moves. A spring 60 has one end secured to pin 58 and has its other end secured to a fixed pin 61 extending from the supporting plate 37. This spring urges ring 48 clockwise, as viewed in FIG. 5.

Rings 41, 42 and 43 (FIG. 4) have extensions 62, 63 and 64, respectively which carry pins 65, 66 and 67. Springs 68, 69 and 70 are secured between the respective pins 65 and 67 and a fixed pin 71 extending from the stationary supporting plate 37. These springs urge the rings 41 to 43 counterclockwise, as viewed in FIG. 5. A stop pin 72 (see FIG. 4) is carried by and extends from the extension 53 of ring 48, and this pin is engageable by the extensions 62 to 64 of rings 41 to 43. As hereinafter described, only one of the rings 41 to 43, is permitted to be effective at one time and its position is determined by the associated one of the stops 31 to 33. With the position of the effective ring established, spring 60 causes the stop pin 72 to engage the associated stop extension of the effective ring so as to establish the desired position of the light polarizing element 30.

As may be seen in FIG. 8, the micrometer adjustment devices 34 to 36 are mounted on a bracket 73 secured to the supporting plate, and the rings 41 to 43 are provided with extensions 74 to 76 through which the positions of the rings are established by the stops 31 to 33. Extensions 74 and 75 have lateral fingers 77 and 78 for engagement with the stops 31 and 32, while extension 76 is engageable directly with stop 33. The only reason for the fingers 77 and 78 is to permit close spacing of the rings 41 to 43.

As may be seen in FIGS. 5 and 6, a shaft 79 is rotatably supported by the supporting plate 37. This shaft is driven synchronously with the shaft 80 of the color filter wheel 13 through a motor driven worm 81 which meshes with worm gears 82 and 83 mounted respectively on the two shafts. Three similar cams 84, 85 and 86 are mounted on shaft 79 and are disposed in 120° angular relation to one another. These cams are engageable with rollers 87, 88 and 89 carried at the ends of rods 90, 91 and 92. The latter have flat central sections which are pin connected to bifurcated extensions 93, 94 and 95 on rings 41 to 43. The upper portions of the rods 90 to 92 are slidably supported by bearing elements 96 to 98 which are rotatably mounted on a fixed stud 99 and are held in spaced relation by spacer rings or collars 100 to 102.

The cams 84 to 86 are shaped so that at any particular time one of the rollers 87 to 89 is out of engagement with its associated cam while the other two rollers are engaged by their associated cams. The two engaged rollers are held by their cams in raised position to render two of the rings 41 to 43 ineffective. Thus, in the condition shown in the drawings, rings 42 and 43 have been moved clockwise, as viewed in FIG. 5, and their extensions 75 and 76 are out of engagement with the associated stops 32 and 33, as may be seen in FIG. 8. Roller 87 is out of engagement with its associated cam 84, and therefore ring 41 is effective and its spring 68 is permitted to move this ring counter-clockwise so that its extension 77 is in engagement with the stop 31. The position of the light polarizing element 30, at this time, is therefore established by the stop 31 through the medium of ring 41, rod 72 and ring 48.

From the foregoing description, it will be seen that rings 41 to 43 are rendered effective successively by the cams 84 to 86, and the effective ring is urged by its spring to a position determined by the associated one of the fixed stops 31 to 33. At the same time, ring 48 is moved by spring 60 to a position determined by the engagement of stop pin 72 with the extension on the effective one of the rings 41 to 43. The light polarizing element 30 follows the movement of ring 48 by reason of the action of spring 57. Thus the rotationally adjustable light polarizing element 30 is moved successively to three positions determined by the fixed stops 31 to 33.

In operation, as the cam shaft 79 is driven synchronously with the shaft 80 of the color filter wheel 13, each time one of the color filter sections 27 to 29 moves into the path of the light beam from source 10, the light polarizing element 30 is positioned for the particular color by one of the stops 31 to 33 corresponding to that color. These stops are present to establish different positions of the light polarizing element 30 for the three colors, and each position of the light polarizing element establishes a predetermined light transmission in beam B equal to the transmission intensity in beam A after partial absorption of light by the desired color concentration in the test cell 19.

The light transmission in beam A through the test cell 19 is compared with the transmission in beam B for each of the colors employed. The light comparison function remains unchanged, and is performed in the manner previously described.

The purpose of the adjusting screw 56 may now be understood. In adjusting the instrument prior to use the three micrometer adjustment devices 34–36 are set to zero extension, so that all three extensions 62 and 64 of rings 41 to 43 contact stop pin 72. With one of the color filters 27 to 29 in position, screw 56 is adjusted until a constant output from photo-tube 25 is obtained. This is preferably done with the sample cell in place as this automatically compensates for the absorbance and reflectance of the cell and water. This procedure effectively standardizes the instrument zero reading for all of the colors employed in filter wheel 13.

From the foregoing description, it will be seen that the present invention provides a novel method and a novel operative combination for establishing a standard for each of the colors employed, and eliminates the necessity of employing a color standard of colored material with its incident objections and disadvantages.

In operation using the standard of FIGS. 4–8 in the system of FIG. 1, beams of light A and B as seen in FIGS. 2 and 3 are adjusted in relative intensities by the standard 14. In practice, the beams are first adjusted to a zero set position as described above in order to compensate for the absorbance and reflectance from cell 19. If the intensities of the two beams remain the same after passing through the sample and the standard, the sensing element 25 will not produce an error signal. If, however, the intensity of the two beams differ, an error signal will be produced and will produce a control signal in the detection and signal producing means 9 to actuate one or more of the solenoids 2a, 2b and/or 2c.

Synchronizing means, which may be mechanical or electrical, synchronizes the control signals with the filter wheel position at its various colors so that the proper valve or combination of valves is operated at the proper time. The valves may be adapted to permit correction in one of several ways. Perhaps the most satisfactory is for the valves to open a fixed amount to permit a unit quantity of fluid through upon indication of any deviation. Then the error will continue to demand such units until the bath is corrected at least in the frequency band represented. Alternatively, the error signal may be quantitative and actuate the valve to add the constituent in proportion to the need.

Figure 9:
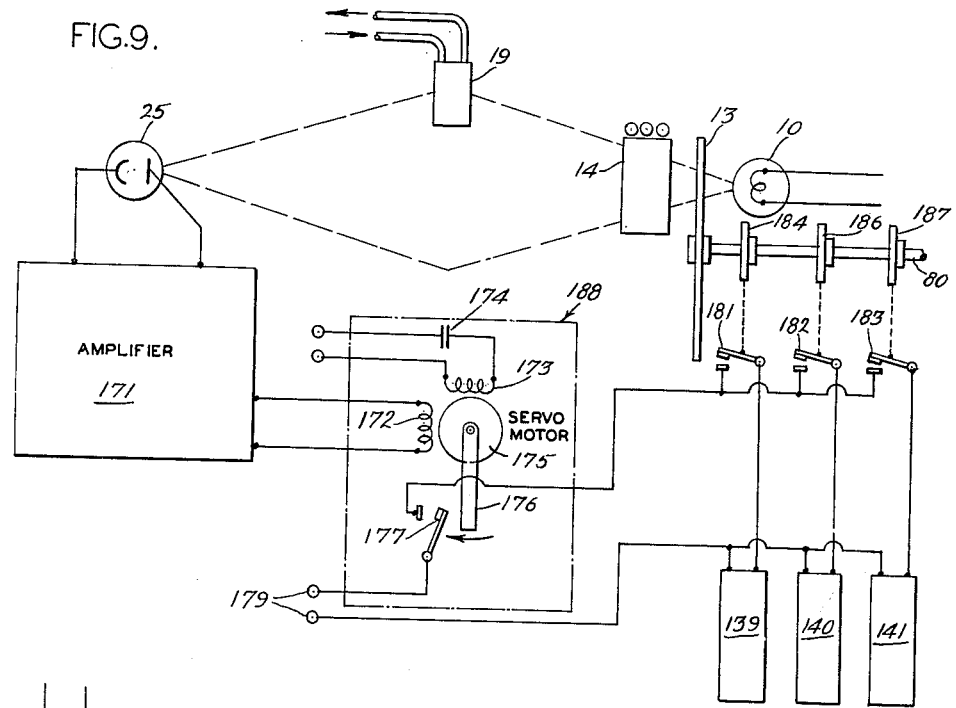
FIG. 9 is a schematic drawing showing one possible actuation system for the valves.
Figure 10:
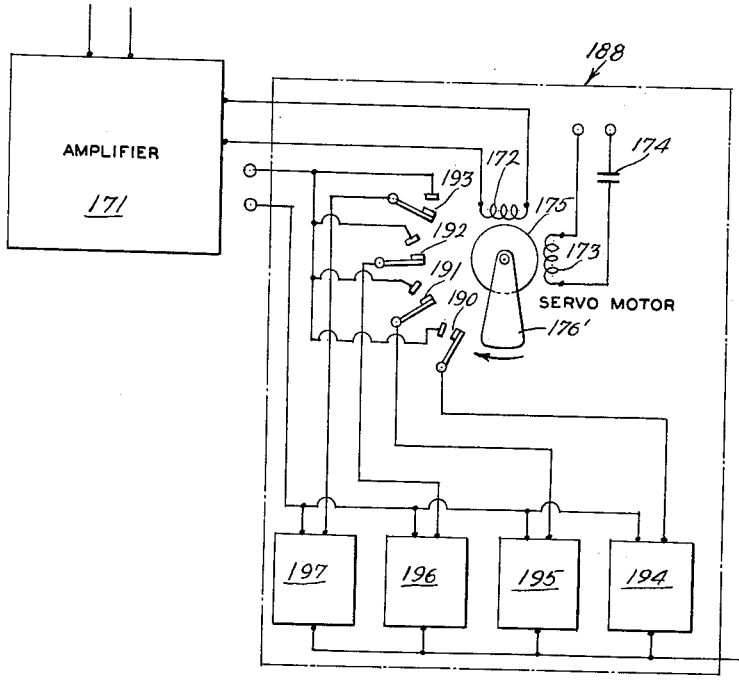
FIG. 10 is a schematic drawing showing how the system of FIG. 9 may be modified to add color constituents in proportion to their deficiencies.

Various actuation systems represented by the box 9 in FIG. 1 are possible within the scope of the present invention. These actuation systems employ components which are commercially available and well known. By way of illustration, and not by way of limitation, two such devices are shown in FIGS. 9 and 10. The system shown in FIG. 9 is intended to be a system in which a fixed amount of color constituent or dilutant is added in response to a signal showing deficiency, and in FIG. 10 a modification of the system of FIG. 9 is illustrated whereby the amount added may be varied in proportion to the deficiency indicated.

Referring to FIG. 9, the relationship of the sample comparison system to the control system 9 is shown. Here it is clear that the light passing from light source 10 is sequentially colored by a filter wheel 13 of the type shown and described in the aforementioned applications and through standard 14 before being split into separate beams passing through sample cell 19 and being subsequently compared at photocell 25. The signal from the photoelectric cell 25 is fed to a photoelectric amplifier 171 of a 60 cycle A.C. type, as described in the copending applications. The nature of this signal is such that it will be in phase with the power supply line current if the dye solution is too weak and color has to be added, or 180° out of phase with the power supply line current if the dye solution requires dilution because the dye constituents are too strong. The output from the amplifier is fed to a field winding 172 of a servomotor having a second phase winding 173 in which the line current is shifted 90° out of phase by a capacitor 174. The armature 175 of the servo motor is spring loaded to a neutral position and is moved out of that position by the effect of current in winding 172. As illustrated, if the signal is produced by an under strength condition, so that additional dye or color constituent is called for, the signal will drive the armature of the motor clockwise, and if driven sufficiently far by a signal of sufficient strength, an actuator 176 on the shaft of the armature will close switch 177.

If the switch 177 were closed, any one of the actuating solenoid 139, 140 or 141, permitting addition of red, yellow or blue color constituents, respectively, would be energized, provided its associated switch 181, 182 or 183 were closed, thus completing the circuit from terminals 179 through switch 177 and the appropriate switch 181, 182 or 183 to the appropriate valve solenoid 139, 140 or 141. Selection of switches 181, 182 and 183 is dependent upon the position of filter wheel 13, and in this diagram it is supposed that filters have been matched to the dyes so that when one filter intercepts a light beam the deficiency of yellow is indicated and when another intercepts the beam a deficiency of red is indicated, and when another intercepts the beam a deficiency of blue is indicated. It is possible to have more complex systems in which multiple switch actuation is required, but the essence of the operation is more easily understood by the simple system illustrated here. Thus, for example, if the filter used for measuring a deficiency of yellow dye is intercepting the light beam at a particular time, a cam 184 on shaft 80 will close switch 181. Then if a deficiency in yellow actually exists, the signal received at servo motor 175 will cause switch 177 to close and valve 139 will be energized and add yellow dye. Similarly, a cam 186 closes switch 182 when the filter for indicating a deficiency of red is in position, and if a deficiency occurs, the circuit through switch 182 to energize valve actuating solenoid 140 will be closed through switch 177. When the filter wheel is in position to indicate a deficiency in blue dye, cam 187 closes switch 183 and, if a deficiency exists, servo motor 175 will close switch 177 thus actuating valve actuating solenoid 141.

In the system shown and described in connection with FIG. 9, a fixed amount of dye material or dilutant is added to the dye regardless of the amount of deficiency. In some cases it is desirable that where deviation is small, a small amount of dye be added, and where deviation is great, a large amount of dye be added. FIG. 10 illustrates a modification of the structure within box 188 in FIG. 9 wherein the same numbers are used to designate corresponding parts and only different parts are designated by different numbers. In this case the actuator 176' is somewhat different in shape but essentially has the same function. The amount of displacement of the armature is proportional to the signal received from the amplifier, and this signal is proportional to the differences in light intensity indicating degrees of difference in the under strength of the dye. As before, signals of this type impressed on field core 172 will drive armature 175 in a clockwise direction but the distance of movement of the armature determines which switch, 190, 191, 192 or 193, is to be closed. If the dye is only slightly under strength, a relatively weak signal will be received from amplifier 171, and the actuator 176' will be moved only as far as switch 190. Closing this switch will enable the closing of the appropriate valve by circuitry similar to that shown in FIG. 9, but in this case through a time delay relay 194. The delay in this case would be perhaps three seconds for a four second interval, so that the relay would close only after the third second and leave only one second of actuation for the particular valve selected by the appropriate cam actuated switch (see FIG. 9). If the signal were slightly greater, indicating somewhat more dilutant condition, the servo motor might close switch 191 causing time delay relay 195 to be effected, and cause a delay of perhaps only two seconds. Similarly, closing switch 192 might cause a delay through relay 196 of only one second and, finally, closing switch 193 would cause a delay through relay 197 of something less than one second or perhaps even no delay at all. In this way, the size of the signal indicating deviation from the standard would permit response or addition of color constituents in proportion to the need.

It will be appreciated that in the above description the switches described are normally open switches unless otherwise identified and are spring loaded so that when the actuator is removed the switch will tend to open. Thus, in the case of actuator 176' the actuator needs to be designed to hold one switch closed until the next switch is ready to be closed in order to assure that in all positions of the servo motor at least one time delay relay is effected. It will be understood that considerable modification in the systems described is possible, and entirely different arrangements for accomplishing the same purposes are intended to be included within the scope of the present invention.

Although the standard of the present invention is concerned primarily with the monitoring of the color of fluid baths it will be apparent to those skilled in the art that the standard lends itself also to testing static color samples. On the other hand, in other systems where possibly a monochromatic or limited frequency band of light is involved, a rotative light polarizing element would not have to be employed as the standard since a fixed element would serve as well.

While a preferred embodiment of the invention has been illustrated and described, the invention is not limited thereto but contemplates such modifications and other embodiments as may occur to those skilled in the art.

While the system specifically shown and described is useful primarily for visible light, it will be understood that modified apparatus in accordance with the present invention may be capable of use with radiation whose frequencies range above and/or below the visible spectrum.

While a filter wheel has been described as a means of producing a plurality of frequency bands, it will be appreciated by those skilled in the art that other means for obtaining a plurality of frequency bands, such as a prism monochromator, may be substituted. It will be obvious that the synchronizing system as applied to the filter might well be modified in such event.

This application constitutes a division of the application of John S. Christie, Serial No. 714,988, filed February 13, 1958 and now Patent No. 2,978,951 which is a continuation-in-part applicantion of the application of John S. Christie, Serial No. 493,127, filed March 9, 1955, now Patent No. 2,928,310.

I claim:

1. A color monitoring system for determining deviation in the color of a fluid bath comprising a light source providing a beam of radiation along a beam path, colored filters sequentially interposed in the beam path to change the color of the beam, a standard arranged in the beam path and variable with each filter representing the intensity of each filter color, means for splitting into two beams the beam directed along the beam path after passing through the standard such that two beams differ in intensity but not in color, a sample holder arranged in the path of the brighter one of the two beams, a fluid flow path between the bath and the sample holder permitting constant change of the sample, means for producing continuous flow from the bath to the sample holder, means for comparing the intensities of the two beams after the brighter beam passes through the sample to determine deviation from the predetermined relative light intensities of the beam which obtains should the sample match the color represented by the standard, color constituent supplies for the fluid bath each having a separate valve, and actuation means responsive to the intensity deviation means for actuation of each of said valves whereby upon detection of deviation a different selection of valves is opened for each color frequency band selected by the color filters to add constituent colors as required to bring the color of the fluid bath back to that of the standard.

2. The system of claim 1 in which the colored filters sequentially color the beams to correspond to the maximum absorbance of the component fluid colors in the sample.

3. The system of claim 2 in which the valves controlling flow from the constituent supplies to the bath respond to the actuating means upon a deviation from the standard by opening an amount in proportion to the deviation.

4. The system of claim 2 in which the valves controlling flow from the constituent supplies to the bath respond to the actuating means upon a deviation from the standard by opening a predetermined amount.

References Cited in the file of this patent

UNITED STATES PATENTS

| | | |
|---|---|---|
| 1,894,132 | Stone | Jan. 10, 1933 |
| 1,976,461 | Prince | Oct. 9, 1934 |
| 1,996,233 | Darrah | April 2, 1935 |
| 2,063,140 | Allison | Dec. 8, 1936 |
| 2,176,013 | Pineo | Oct. 10, 1939 |
| 2,753,754 | Le Clair | July 10, 1956 |
| 2,928,310 | Christie | Mar. 15, 1960 |
| 2,979,066 | Christie | Apr. 11, 1961 |